United States Patent
Tanaka et al.

(10) Patent No.: US 8,404,785 B2
(45) Date of Patent: Mar. 26, 2013

(54) METHOD FOR PRODUCING MODIFIED CONJUGATED DIENE POLYMER, MODIFIED CONJUGATED DIENE POLYMER, AND RUBBER COMPOSITION

(75) Inventors: Ryouji Tanaka, Chuo-ku (JP); Kouichirou Tani, Chuo-ku (JP); Takuo Sone, Chuo-ku (JP); Toshihiro Tadaki, Chuo-ku (JP)

(73) Assignee: JSR Corporation, Tokyo (JP)

( * ) Notice: Subject to any disclaimer, the term of this patent is extended or adjusted under 35 U.S.C. 154(b) by 675 days.

(21) Appl. No.: 12/521,124

(22) PCT Filed: Dec. 27, 2007

(86) PCT No.: PCT/JP2007/075165
§ 371 (c)(1),
(2), (4) Date: Jun. 25, 2009

(87) PCT Pub. No.: WO2008/078813
PCT Pub. Date: Jul. 3, 2008

(65) Prior Publication Data
US 2010/0105827 A1    Apr. 29, 2010

(30) Foreign Application Priority Data
Dec. 27, 2006 (JP) ................................. 2006-352659

(51) Int. Cl.
*C08C 19/20* (2006.01)
*C08C 19/22* (2006.01)
*C08K 3/04* (2006.01)
*C08K 3/36* (2006.01)

(52) U.S. Cl. ............ 525/331.9; 525/332.9; 525/333.1; 525/333.2; 525/350; 525/374; 525/379; 525/381; 525/382; 525/384; 524/572

(58) Field of Classification Search ............... 525/331.9, 525/332.9, 333.1, 333.2, 350, 374, 379, 381, 525/382, 384; 524/572
See application file for complete search history.

(56) References Cited

U.S. PATENT DOCUMENTS

| | | | |
|---|---|---|---|
| 4,424,306 A | 1/1984 | Kitahara et al. | |
| 4,906,706 A | 3/1990 | Hattori et al. | |
| 5,064,910 A | 11/1991 | Hattori et al. | |
| 6,838,526 B1 | 1/2005 | Sone et al. | |
| 7,202,306 B2 | 4/2007 | Tanaka et al. | |
| 2004/0147694 A1 | 7/2004 | Sone et al. | |
| 2004/0230010 A1* | 11/2004 | Kwag et al. | 525/331.9 |
| 2005/0009979 A1* | 1/2005 | Tanaka et al. | 524/492 |
| 2005/0020757 A1 | 1/2005 | Ozawa et al. | |
| 2005/0070672 A1 | 3/2005 | Ozawa et al. | |
| 2006/0264560 A1 | 11/2006 | Tanaka et al. | |
| 2008/0015309 A1 | 1/2008 | Ozawa et al. | |
| 2008/0188613 A1 | 8/2008 | Tanaka et al. | |
| 2009/0105408 A1* | 4/2009 | Yan | 524/547 |

FOREIGN PATENT DOCUMENTS

| | | |
|---|---|---|
| EP | 1 790 666 A1 | 5/2007 |
| EP | 1 873 168 A1 | 1/2008 |
| JP | 57 212221 | 12/1982 |
| JP | 63 297403 | 12/1988 |
| JP | 10 306113 | 11/1998 |
| JP | 2001 139634 | 5/2001 |
| JP | 2002 30110 | 1/2002 |
| JP | 2003 327704 | 11/2003 |
| JP | 2005 8870 | 1/2005 |
| JP | 2005 82735 | 3/2005 |
| WO | 03 046020 | 6/2003 |
| WO | 03 048216 | 6/2003 |
| WO | WO 2006/030806 A1 | 3/2006 |
| WO | WO 2006/101025 A1 | 9/2006 |
| WO | WO 2006/112450 A1 | 10/2006 |

OTHER PUBLICATIONS

U.S. Appl. No. 12/089,216, filed Apr. 4, 2008, Tanaka, et al.
U.S. Appl. No. 12/521,331, filed Jun. 26, 2009, Tanaka, et al.
U.S. Appl. No. 12/521,340, filed Jun. 26, 2009, Tanaka, et al.
Office Action issued Feb. 22, 2011 in China Application No. 200780051097.7.

* cited by examiner

*Primary Examiner* — Roberto Rabago
(74) *Attorney, Agent, or Firm* — Oblon, Spivak, McClelland, Maier & Neustadt, L.L.P.

(57) ABSTRACT

A method for producing a modified conjugated diene polymer includes a step (A) carrying out a primary modification reaction that reacts a heterocumulene compound having two or more specific functional groups with a conjugated diene polymer having a vinyl content of below 10% and a cis-1,4-bond content of 75% or more and possessing an active end to obtain a primary-modified conjugated diene polymer, and a step (B) carrying out a secondary modification reaction that reacts an active hydrogen-containing compound that includes one or more functional groups selected from the group consisting of an amino group, an imino group, a mercapto group, and a hydroxyl group with the primary-modified conjugated diene polymer to obtain a secondary-modified conjugated diene polymer. The method can produce a modified conjugated diene polymer that exhibits low heat build-up (low fuel consumption) and excellent wear resistance.

10 Claims, No Drawings

METHOD FOR PRODUCING MODIFIED CONJUGATED DIENE POLYMER, MODIFIED CONJUGATED DIENE POLYMER, AND RUBBER COMPOSITION

This application is a 371 of PCT/JP2007/075165, filed Dec. 27, 2007.

TECHNICAL FIELD

The present invention relates to a method for producing a modified conjugated diene polymer, a modified conjugated diene polymer, a rubber composition, a tire member including the rubber composition, and a tire including the tire member. More particularly, the present invention provides a method for producing a modified conjugated diene polymer that can produce a modified conjugated diene polymer that exhibits low heat build-up (low fuel consumption) and excellent wear resistance, a modified conjugated diene polymer obtained by the method, a rubber composition including the modified conjugated diene polymer, a tire member including the rubber composition, and a tire including the tire member.

BACKGROUND ART

In recent years, a reduction in fuel consumption of automobiles has been increasingly desired along with a demand for energy conservation. In order to deal with such a demand, a further reduction in rolling resistance of tires has been desired. The rolling resistance of tires may be reduced by optimizing the tire structure. In general, the rolling resistance has been reduced by utilizing a rubber composition that exhibits low heat build-up.

In order to obtain such a rubber composition that exhibits low heat build-up, various modified rubbers have been developed for a rubber composition that contains silica or carbon black as a filler. For example, a method of modifying a polymerization active end of a conjugated diene polymer obtained by anionic polymerization using an organolithium compound with an alkoxysilane derivative having a functional group that interacts with a filler has been proposed.

However, most of these methods are applied to a polymer of which the polymer end exhibits living properties. Specifically, only a small number of methods that modify cis-1,4-polybutadiene that is particularly important for a tire sidewall rubber or a tire tread rubber have been proposed. Moreover, the modification effect on a rubber composition that contains carbon black or silica is not necessarily sufficient. In particular, a modification effect on a carbon black-containing rubber has not been obtained with regard to cis-1,4-polybutadiene.

In order to solve the above problems, a method that produces a conjugated diene polymer in which carbon black is easily dispersed by reacting a specific functional group-containing compound (modifier) having a nitrogen atom in the molecule with a conjugated diene polymer (see Patent Document 1), and a method that modifies or couples a conjugated diene polymer with at least one compound selected from the group consisting of a quinone compound, a thiazole compound, a sulfeneamide compound, a dithiocarbamate compound, a thiuram compound, and a thioimide compound to produce a modified conjugated diene polymer (see Patent Document 2), have been proposed.

A method that reacts an active end of a conjugated diene polymer having a high cis content obtained using a rare earth catalyst with a functional group-containing alkoxysilane derivative that interacts with a filler to obtain an end-modified conjugated diene polymer, and a method that adds a condensation accelerator to the reaction system when performing alkoxysilane modification have also been proposed (see Patent Documents 3 and 4).

Patent Document 1: JP-A-2001-139634
Patent Document 2: JP-A-2002-30110
Patent Document 3: WO 03/046020
Patent Document 4: JP-A-2005-8870

DISCLOSURE OF THE INVENTION

However, a modified conjugated diene polymer produced by such a related-art method does not exhibit sufficiently low heat build-up and sufficient wear resistance. Therefore, development of a method for producing that can obtain a modified conjugated diene polymer that exhibits lower heat build-up has been desired.

The present invention was conceived in order to solve the above-described problems. An object of the present invention is to provide a method for producing a modified conjugated diene polymer that can produce a modified conjugated diene polymer that exhibits low heat build-up and excellent wear resistance, a modified conjugated diene polymer obtained by the method, a rubber composition including the modified conjugated diene polymer, a tire member including the rubber composition, and a tire including the tire member.

The inventors of the present invention conducted extensive studies in order to achieve the above object. As a result, the inventors found that the above object can be achieved by subjecting the active end of a specific conjugated diene polymer to a modification reaction (primary modification reaction) with a heterocumulene compound having two or more specific functional groups, and further subjecting the resulting product (primary-modified conjugated diene polymer) to a modification reaction (secondary modification reaction) with an active hydrogen-containing compound. This finding has led to the completion of the present invention.

Specifically, the present invention provides a method for producing a modified conjugated diene polymer, a modified conjugated diene polymer obtained by the method, a rubber composition including the modified conjugated diene polymer, a tire member including the rubber composition, and a tire including the tire member defined below.

[1] A method for producing a modified conjugated diene polymer, comprising a step (A) carrying out a modification reaction (primary modification reaction) that reacts a component (a) with a conjugated diene polymer having a vinyl content of below 10% and a cis-1,4-bond content of 75% or more and possessing an active end to introduce the component (a) into the active end of the conjugated diene polymer to obtain a primary-modified conjugated diene polymer, and a step (B) carrying out a modification reaction (secondary modification reaction) that reacts a component (b) with the primary-modified conjugated diene polymer to introduce the component (b) into a functional group of the primary-modified conjugated diene polymer derived from the component (a) to obtain a secondary-modified conjugated diene polymer, the component (a) being a heterocumulene compound that includes two or more functional groups shown by the general formula (1): $X{=}C{=}Y$ (wherein X represents a carbon atom or a nitrogen atom, and Y represents an oxygen atom, a nitrogen atom, or a sulfur atom) in the molecular structure, and the component (b) being an active hydrogen-containing compound that includes one or more functional groups selected from the group consisting of an amino group, an imino group, a mercapto group, and a hydroxyl group.

[2] The method for producing a modified conjugated diene polymer according to [1], wherein two or more functional groups among the functional groups shown by the general formula (1) included in the heterocumulene compound are isocyanate groups.

[3] The method for producing a modified conjugated diene polymer according to [1] or [2], wherein the component (b) is an active hydrogen-containing compound that includes two or more functional groups selected from the group consisting of an amino group, an imino group, a mercapto group, and a hydroxyl group.

[4] The method for producing a modified conjugated diene polymer according to any one of [1] to [3], wherein the step (B) utilizes a catalyst that promotes a reaction between the functional group of the primary-modified conjugated diene polymer derived from the component (a) and the component (b).

[5] The method for producing a modified conjugated diene polymer according to [4], wherein the catalyst is a compound that includes a tertiary amino group or a compound that includes one or more elements among the elements of the groups 4A, 2B, 3B, 4B, and 5B in the periodic table.

[6] The method for producing a modified conjugated diene polymer according to any one of [1] to [5], wherein the conjugated diene polymer includes a repeating unit derived from a monomer selected from the group consisting of 1,3-butadiene, isoprene, and 2,3-dimethyl-1,3-butadiene.

[7] The method for producing a modified conjugated diene polymer according to any one of [1] to [6], wherein the conjugated diene polymer has been polymerized in the presence of a catalyst that includes components (c) to (e) as main components, the component (c) being a lanthanoid element-containing compound that contains at least one lanthanoid element or a reaction product obtained by reacting the lanthanoid element-containing compound with a Lewis base, the component (d) being at least one compound selected from an alumoxane and an organoaluminum compound shown by the general formula (2): $AlR^1R^2R^3$ (wherein $R^1$ and $R^2$ individually represent a hydrocarbon group having 1 to 10 carbon atoms or a hydrogen atom, and $R^3$ represents a hydrocarbon group having 1 to 10 carbon atoms that is the same as or differs from $R^1$ and $R^2$), and the component (e) being a halogen-containing compound that contains at least one halogen element in the molecular structure.

[8] The method for producing a modified conjugated diene polymer according to any one of [1] to [7], wherein the conjugated diene polymer has a cis-1,4-bond content of 98.5% or more and a ratio (Mw/Mn) of the weight average molecular weight (Mw) to the number average molecular weight (Mn) determined by gel permeation chromatography of 3.5 or less.

[9] A modified conjugated diene polymer produced by the method for producing a modified conjugated diene polymer according to any one of [1] to [8].

[10] A rubber composition comprising the modified conjugated diene polymer according to [9] as a rubber component.

[11] The rubber composition according to [10], further comprising at least one of carbon black and silica.

[12] The rubber composition according to [11], wherein the rubber composition contains at least one of carbon black and silica in an amount of 20 to 120 parts by mass based on 100 parts by mass of the rubber component that contains the modified conjugated diene polymer in an amount of 20 mass % or more.

[13] The rubber composition according to any one of [10] to [12], wherein the rubber component includes 20 to 100 mass % of the modified conjugated diene polymer, and 0 to 80 mass % of at least one rubber component selected from the group consisting of a natural rubber, a synthetic isoprene rubber, a butadiene rubber, a styrene-butadiene rubber, an ethylene-α-olefin copolymer rubber, an ethylene-α-olefin-diene copolymer rubber, an acrylonitrile-butadiene copolymer rubber, a chloroprene rubber, and a halogenated butyl rubber (provided that the modified conjugated diene polymer+the rubber component other than the modified conjugated diene polymer=100 mass %).

[14] A tire member comprising the rubber composition according to any one of [10] to [13].

[15] A tire comprising the tire member according to [14].

According to the present invention, a method for producing a modified conjugated diene polymer that can produce a modified conjugated diene polymer that exhibits low heat build-up (low fuel consumption) and excellent wear resistance, a modified conjugated diene polymer obtained by the method, a rubber composition including the modified conjugated diene polymer, a tire member including the rubber composition, and a tire including the tire member can be provided. In particular, the modified conjugated diene polymer obtained by the present invention exhibits excellent processability when mixed with carbon black or silica. A vulcanized rubber produced by vulcanizing the modified conjugated diene polymer exhibits low heat build-up (low fuel consumption) and excellent wear resistance.

BEST MODE FOR CARRYING OUT THE INVENTION

The preferred embodiments for carrying out the present invention are described below. However, the present invention is not restricted to the following embodiments and it should be construed that there are also included, in the present invention, those embodiments in which appropriate changes, improvements, etc. have been made to the following embodiments based on the ordinary knowledge possessed by those skilled in the art, as long as there is no deviation from the gist of the present invention.

[1] Method for Producing Modified Conjugated Diene Polymer

A method for producing a modified conjugated diene polymer according to one embodiment of the present invention is described below. The method for producing a modified conjugated diene polymer of the present embodiment includes a step (A) carrying out a modification reaction (primary modification reaction) that reacts a component (a) with a conjugated diene polymer having a vinyl content of below 10% and a cis-1,4-bond content of 75% or more and possessing an active end to introduce the component (a) into the active end of the conjugated diene polymer to obtain a primary-modified conjugated diene polymer, and a step (B) carrying out a modification reaction (secondary modification reaction) that reacts a component (b) with the primary-modified conjugated diene polymer to introduce the component (b) into a functional group of the primary-modified conjugated diene polymer derived from the component (a) to obtain a secondary-modified conjugated diene polymer.

Component (a) A heterocumulene compound that includes two or more functional groups shown by the general formula (1): $X\!=\!C\!=\!Y$ (wherein X represents a carbon atom or a nitrogen atom, and Y represents an oxygen atom, a nitrogen atom, or a sulfur atom) in the molecular structure Component (b) An active hydrogen-containing compound that includes one or more functional groups selected from the group consisting of an amino group, an imino group, a mercapto group, and a hydroxyl group Since the method for producing a modified conjugated diene polymer of the present embodiment includes the primary modification reaction that introduces the component (a) into the active end of the conjugated diene polymer and the secondary modification reaction that introduces the component (b) into the functional group derived from the component (a), the molecular weight of the conjugated diene polymer can be increased, or the polymer chain can be branched so that a novel modified conjugated diene polymer that exhibits improved interaction with carbon black or silica can be produced.

A modified conjugated diene polymer that exhibits low heat build-up (low fuel consumption) and excellent wear resistance can be obtained by carrying out the above-mentioned two modification reactions (primary and secondary modification reactions). A composition obtained by mixing carbon black or silica with the modified conjugated diene polymer obtained by the method of the present embodiment exhibits excellent processability. A vulcanized rubber produced by vulcanizing the composition exhibits low heat build-up (low fuel consumption) and excellent wear resistance.

[1-1] Conjugated Diene Polymer

The conjugated diene polymer used in the method for producing a modified conjugated diene polymer of the present embodiment has a vinyl content of below 10% and a cis-1,4-bond content of 75% or more and possesses an active end. A method of producing the conjugated diene polymer is not particularly limited. The conjugated diene polymer may be produced by a method using a known polymerization reaction.

As the conjugated diene polymer, a polymer having a repeating unit derived from a monomer selected from the group consisting of 1,3-butadiene, isoprene, 2,3-dimethyl-1, 3-butadiene, 1,3-pentadiene, 1,3-hexadiene, and myrcene may be used, for example. In particular, a polymer having a repeating unit derived from a monomer selected from the group consisting of 1,3-butadiene, isoprene, and 2,3-dimethyl-1,3-butadiene may be suitably used.

The conjugated diene polymer may be polymerized in the presence or absence of a solvent. The polymerization solvent may be an inert organic solvent. Examples of the inert organic solvent include saturated aliphatic hydrocarbons having 1 to 4 carbon atoms such as butane, pentane, hexane, and heptane; saturated alicyclic hydrocarbons having 6 to 20 carbon atoms such as cyclopentane and cyclohexane; monoolefins such as 1-butene and 2-butene; aromatic hydrocarbons such as benzene, toluene, and xylene; and halogenated hydrocarbons such as methylene chloride, chloroform, carbon tetrachloride, trichloroethylene, perchloroethylene, 1,2-dichloroethane, chlorobenzene, bromobenzene, and chlorotoluene.

The polymerization reaction temperature when producing the conjugated diene polymer is normally −30° C. to 200° C., and preferably 0° C. to 150° C. The polymerization reaction may be carried out in an arbitrary manner. The polymerization reaction may be carried out using a batch-type reactor, or may be continuously carried out using an apparatus such as a multistage continuous reactor.

When using the polymerization solvent, the monomer concentration in the solvent is preferably 5 to 50 mass %, and more preferably 7 to 35 mass %. It is preferable to prevent the polymerization system from being contaminated by an inactivating compound such as oxygen, water, or carbon dioxide from the viewpoint of producing the conjugated diene polymer and preventing inactivation of the conjugated diene polymer having an active end.

In the method for producing a modified conjugated diene polymer of the present embodiment, it is preferable to use a conjugated diene polymer that has been polymerized using a catalyst (catalyst composition) that includes the following components (c) to (e) as the main components.

The term "main component" means that the catalyst may include other components insofar as the physical/chemical characteristics of any of the components (c) to (e) are not impaired to a large extent. In the method for producing a modified conjugated diene polymer of the present embodiment, it is preferable that the total amount of the components (c) to (e) be 50 mass % or more based on the total mass of the catalyst. When the catalyst includes at least one of a conjugated diene compound and a non-conjugated diene compound mentioned below, it is preferable that the total amount of the components (c) to (e) be 90 mass % or more based on the total mass of the catalyst excluding the conjugated diene compound and the non-conjugated diene compound.

Component (c) A lanthanoid element-containing compound that contains at least one of the lanthanoid elements (i.e., the rare earth elements having atomic numbers 57 to 71 in the periodic table) or a reaction product obtained by reacting the lanthanoid element-containing compound with a Lewis base Component (d) At least one compound selected from an alumoxane and an organoaluminum compound shown by the general formula (2): $AlR^1R^2R^3$ (wherein $R^1$ and $R^2$ individually represent a hydrocarbon group having 1 to 10 carbon atoms or a hydrogen atom, and $R^3$ represents a hydrocarbon group having 1 to 10 carbon atoms that is the same as or different from $R^1$ and $R^2$)

Component (e) A halogen-containing compound that contains at least one halogen element in the molecular structure The conjugated diene polymer having a narrow molecular weight distribution and a high cis-1,4-bond content can be produced by producing the conjugated diene polymer using such a catalyst (catalyst composition). Moreover, the catalyst (catalyst composition) is inexpensive as compared with a metallocene catalyst, and does not require a polymerization reaction to be performed at an extremely low temperature. Therefore, the catalyst (catalyst composition) simplifies the operation and is useful for an industrial production process.

[1-1a] Component (c)

The component (c) is a lanthanoid element-containing compound that contains at least one of the lanthanoid elements (the rare earth elements having atomic numbers 57 to 71 in the periodic table) or a reaction product obtained by reacting the lanthanoid element-containing compound with a Lewis base.

Specific examples of the lanthanoid elements include neodymium, praseodymium, cerium, lanthanum, gadolinium, samarium, and the like. Among these, neodymium is preferable. These lanthanoid elements may be used individually or in combination. Specific examples of the lanthanoid element-containing compound include a lanthanoid carboxylate, a lanthanoid alkoxide, a lanthanoid-β-diketone complex, a lanthanoid phosphate, a lanthanoid phosphite, and the like. Among these, the carboxylate or the phosphate is preferable, with the carboxylate being more preferable.

Specific examples of the lanthanoid carboxylate include carboxylates shown by the general formula (3): $(R^4-CO_2)_3M$ (wherein M represents a lanthanoid element, and $R^4$ represents a hydrocarbon group having 1 to 20 carbon atoms).

$R^4$ in the general formula (3) is preferably a saturated or unsaturated linear, branched, or cyclic alkyl group. The carboxyl group is bonded to a primary, secondary, or tertiary carbon atom. Specific examples include salts of octanoic acid, 2-ethylhexanoic acid, oleic acid, stearic acid, benzoic acid, naphthenic acid, Versatic acid (i.e., a carboxylic acid in which a carboxyl group is bonded to a tertiary carbon atom, manufactured by Shell Chemicals Co., Ltd.), and the like. Among these, a salt of 2-ethylhexanoic acid, a salt of naphthenic acid, and a salt of Versatic acid are preferable.

Specific examples of the lanthanoid alkoxide include alkoxides shown by the general formula (4): $(R^5O)_3M$ (wherein M represents a lanthanoid element, and $R^5$ represents a hydrocarbon group having 1 to 20 carbon atoms (preferably a saturated or unsaturated linear, branched, or cyclic hydrocarbon group), and the carboxyl group group is bonded to a primary, secondary, or tertiary carbon atom). Specific examples of the alkoxy group represented by "$R^5O$" in the general formula (4) include a 2-ethylhexylalkoxy group, an oleylalkoxy group, a stearylalkoxy group, a phenoxy group, a benzylalkoxy group, and the like. Among these, a 2-ethylhexylalkoxy group and a benzylalkoxy group are preferable.

Specific examples of the lanthanoid-β-diketone complex include an acetylacetone complex, a benzoylacetone complex, a propionitrile acetone complex, a valerylacetone complex, an ethylacetylacetone complex, and the like. Among these, an acetylacetone complex and an ethylacetylacetone complex are preferable.

Specific examples of the lanthanoid phosphate or phosphite include lanthanoid salts of bis(2-ethylhexyl)phosphate, bis(1-methylheptyl)phosphate, bis(p-nonylphenyl)phosphate, bis(polyethylene glycol-p-nonylphenyl)phosphate, (1-methylheptyl)(2-ethylhexyl)phosphate, (2-ethylhexyl)(p-nonylphenyl)phosphate, mono-2-ethylhexyl-2-ethylhexylphosphonate, mono-p-nonylphenyl-2-ethylhexylphosphonate, bis(2-ethylhexyl)phosphinate, bis(1-methylheptyl)phosphinate, bis(p-nonylphenyl)phosphinate, (1-methylheptyl)(2-ethylhexyl)phosphinate, (2-ethylhexyl)(p-nonylphenyl)phosphinate, and the like. Among these, salts of bis(2-ethylhexyl)phosphate, bis(1-methylheptyl)phosphate, mono-2-ethylhexyl-2-ethylhexyl phosphonate, and bis(2-ethylhexyl)phosphinate are preferable.

As the lanthanoid element-containing compound, the neodymium phosphate or the neodymium carboxylate are preferable, with the neodyum carboxylate such as neodymium 2-ethylhexanoate and neodymium versatate being particularly preferable.

In order to solubilize the lanthanoid element-containing compound in a solvent or stably store the lanthanoid element-containing compound for a long period of time, it is also preferable to mix the lanthanoid element-containing compound with a Lewis base, or use a reaction product obtained by reacting the lanthanoid element-containing compound with a Lewis base.

The amount of Lewis base is preferably 0 to 30 mol, and more preferably 1 to 10 mol, based on 1 mol of the lanthanoid element. Specific examples of the Lewis base include acetylacetone, tetrahydrofuran, pyridine, N,N-dimethylformamide, thiophene, diphenyl ether, triethylamine, an organic phosphorous compound, a monohydric or dihydric alcohol, and the like. The component (c) may be used individually or in combination.

[1-1b] Component (d)

The component (d) is at least one compound selected from an alumoxane and an organoaluminum compound shown by the general formula (2): $AlR^1R^2R^3$ (wherein $R^1$ and $R^2$ individually represent a hydrocarbon group having 1 to 10 carbon atoms or a hydrogen atom, and $R^3$ represents a hydrocarbon group having 1 to 10 carbon atoms that is the same as or different from $R^1$ and $R^2$).

The alumoxane (aluminoxane) is a compound having a structure shown by the following formula (5) or (6). The alumoxane may be an alumoxane association product disclosed in Fine Chemicals, 23 (9), 5 (1994), J. Am. Chem. Soc., 115, 4971 (1993) and J. Am. Chem. Soc., 117, 6465 (1995).

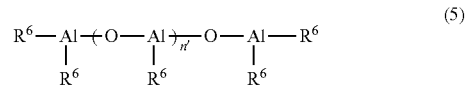

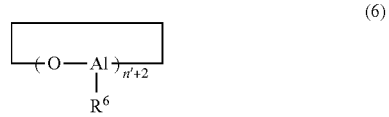

In the general formulas (5) and (6), $R^6$ represents a hydrocarbon group having 1 to 20 carbon atoms, and n' represents an integer equal to or larger than two. Specific examples of the hydrocarbon group represented by $R^6$ in the general formulas (5) and (6) include a methyl group, an ethyl group, a propyl group, a butyl group, an isobutyl group, a t-butyl group, a hexyl group, an isohexyl group, an octyl group, an isooctyl group, and the like. Among these, a methyl group, an ethyl group, an isobutyl group, and a t-butyl group are preferable, with a methyl group being more preferable. In the general formulas (5) and (6), n' is preferably an integer from 4 to 100.

Specific examples of the alumoxane include methylalumoxane (MAO), ethylalumoxane, n-propylalumoxane, n-butylalumoxane, isobutylalumoxane, t-butylalumoxane, hexylalumoxane, iso-hexylalumoxane, and the like.

The alumoxane may be produced by a known method. For example, the alumoxane may be produced by adding a trialkylaluminum or a dialkylaluminum monochloride to an organic solvent such as benzene, toluene, or xylene, adding water, steam, steam-containing nitrogen gas, or a salt containing crystal water such as copper sulfate pentahydrate or aluminum sulfate hexadecahydrate, and reacting the mixture. These alumoxanes may be used individually or in combination.

Specific examples of the organoaluminum compound shown by the general formula (2) include trimethylaluminum, triethylaluminum, tri-n-propylaluminum, triisopropylaluminum, tri-n-butylaluminum, triisobutylaluminum, tri-t-butylaluminum, tripentylaluminum, trihexylaluminum, tricyclohexylaluminum, trioctylaluminum, hydrogenated diethylaluminum, hydrogenated di-n-propylaluminum, hydrogenated di-n-butylaluminum, hydrogenated diisobutylaluminum, hydrogenated dihexylaluminum, hydrogenated diisohexylaluminum, hydrogenated dioctylaluminum, hydrogenated diisooctylaluminum, ethylaluminum dihydride, n-propylaluminum dihydride, isobutylaluminum dihydride, and the like. Among these, triethylaluminum, triisobutylaluminum, hydrogenated diethylaluminum, hydrogenated diisobutylaluminum, and the like are preferable. These organoaluminum compounds may be used individually or in combination.

[1-1c] Component (e)

The component (e) is a halogen-containing compound that contains at least one halogen atom in the molecular structure.

Examples of the component (e) include a reaction product of a metal halide and a Lewis base, diethyl aluminum chloride, silicon tetrachloride, trimethylchlorosilane, methyldichlorosilane, dimethyldichlorosilane, methyltrichlorosilane, ethylaluminum dichloride, ethylaluminum sesquichloride, tin tetrachloride, tin trichloride, phosphorus trichloride, benzoyl chloride, t-butyl chloride, trimethylsilyl iodide, triethylsilyl iodide, dimethylsilyl iodide, diethylaluminum iodide, methyl iodide, butyl iodide, hexyl iodide, octyl iodide, iodoform, methylene iodide, iodine, benzylidene iodide, and the like.

Examples of the metal halide include beryllium chloride, beryllium bromide, beryllium iodide, magnesium chloride, magnesium bromide, magnesium iodide, calcium chloride, calcium bromide, calcium iodide, barium chloride, barium bromide, barium iodide, zinc chloride, zinc bromide, zinc iodide, cadmium chloride, cadmium bromide, cadmium iodide, mercury chloride, mercury bromide, mercury iodide, manganese chloride, manganese bromide, manganese iodide, rhenium chloride, rhenium bromide, rhenium iodide, copper chloride, copper iodide, silver chloride, silver bromide, silver iodide, gold chloride, gold iodide, gold bromide, and the like.

Among these metal halides, magnesium chloride, calcium chloride, barium chloride, manganese chloride, zinc chloride, copper chloride, magnesium iodide, calcium iodide, barium iodide, manganese iodide, zinc iodide, and copper iodide are preferable, with magnesium chloride, manganese chloride, zinc chloride, copper chloride, magnesium iodide, manganese iodide, zinc iodide, and copper iodide being particularly preferable.

As the Lewis base reacted with the metal halide, a phosphorus compound, a carbonyl compound, a nitrogen compound, an ether compound, an alcohol, and the like are preferably used.

Specific examples of the Lewis base include tributyl phosphate, tri-2-ethylhexyl phosphate, triphenyl phosphate, tricresyl phosphate, triethyl phosphine, tributyl phosphine, triphenyl phosphine, diethyl phosphinoethane, diphenyl phosphinoethane, acetylacetone, benzoylacetone, propionitrile acetone, valeryl acetone, ethyl acetylacetone, methyl acetoacetate, ethyl acetoacetate, phenyl acetoacetate, dimethyl malonate, diethyl malonate, diphenyl malonate, acetic acid, octanoic acid, 2-ethylhexanoic acid, oleic acid, stearic acid, benzoic acid, naphthenic acid, Versatic acid (manufactured by Shell Chemicals Co., Ltd., a carboxylic acid in which the carboxyl group is bonded to a tertiary carbon atom), triethylamine, N,N-dimethylacetamide, tetrahydrofuran, diphenyl ether, 2-ethylhexyl alcohol, oleyl alcohol, stearyl alcohol, phenol, benzyl alcohol, 1-decanol, lauryl alcohol, and the like.

Among these, tri-2-ethylhexyl phosphate, tricresyl phosphate, acetylacetone, 2-ethylhexanoic acid, Versatic acid, 2-ethylhexyl alcohol, 1-decanol, lauryl alcohol, and the like are preferable.

The Lewis base is preferably reacted with the metal halide in an amount of 0.01 to 30 mol, and more preferably 0.05 to 10 mol, based on 1 mol of the metal halide. The amount of metal remaining in the polymer can be reduced when using a reaction product of the metal halide and the Lewis base.

The mixing ratio of each component (components (c) to (e)) used as the main components of the catalyst may be appropriately set. The component (c) is preferably used in an amount of 0.00001 to 1.0 mmol, and more preferably 0.0001 to 0.5 mmol, based on 100 g of the conjugated diene compound. If the amount of the component (c) is below 0.00001 mmol, the polymerization activity may decrease. If the amount of the component (c) is exceeding 1.0 mmol, a deashing step may be required due to an increase in catalyst concentration.

When using the alumoxane as the component (d), a preferable amount of the alumoxane contained in the catalyst may be indicated by the molar ratio of the component (c) to aluminum (Al) contained in the alumoxane. Specifically, the molar ratio of the component (c) to aluminum (Al) contained in the alumoxane is preferably 1:1 to 1:500, more preferably 1:3 to 1:250, and particularly preferably 1:5 to 1:200. If the molar ratio is outside the above range, the catalytic activity may decrease, or a step of removing the catalyst residue may be necessary.

When using the organoaluminum compound as the component (d), a preferable amount of the organoaluminum compound contained in the catalyst composition may be indicated by the molar ratio of the component (c) to the organoaluminum compound. Specifically, the molar ratio of the component (c) to the organoaluminum compound is preferably 1:1 to 1:700, and more preferably 1:3 to 1:500. If the molar ratio is outside the above range, the catalytic activity may decrease, or a step of removing the catalyst residue may be necessary.

A preferable amount of the component (e) contained in the catalyst composition may be indicated by the molar ratio of the halogen atom contained in the component (e) to the component (c). Specifically, the molar ratio of the halogen atom to the component (c) is preferably 20 to 0.1, more preferably 15 to 0.2, and particularly preferably 8 to 0.5.

The catalyst preferably includes at least one of a conjugated diene compound and a non-conjugated diene compound in addition to the components (c) to (e) in an amount of 1000 mol or less, more preferably 150 to 1000 mol, and particularly preferably 3 to 300 mol, based on 1 mol of the component (c). The catalytic activity is further improved by adding at least one of a conjugated diene compound and a non-conjugated diene compound to the catalyst composition.

Examples of the conjugated diene compound added to the catalyst include 1,3-butadiene, isoprene, and the like. Examples of the non-conjugated diene compound include divinylbenzene, diisopropenylbenzene, triisopropenylbenzene, 1,4-vinylhexadiene, ethylidenenorbornene, and the like.

[1-1d] Preparation of Catalyst (Catalyst Composition)

The catalyst (catalyst composition) used in the method for producing a conjugated diene polymer of the present embodiment may be prepared by reacting the components (c) to (e) dissolved in a solvent optionally together with at least one of the conjugated diene compound and the non-conjugated diene compound, for example. Each component may be added in an arbitrary order. Note that it is preferable to previously mix and react each component and age the reaction product in order to improve the catalytic activity and reduce the polymerization initiation induction period.

The aging temperature is preferably 0 to 100° C., and more preferably 20 to 80° C. If the aging temperature is below 0° C., aging may be insufficient. If the aging temperature is exceeding 100° C., the catalytic activity may decrease, or the molecular weight distribution may broaden.

The aging time is not particularly limited. The components may be caused to come in contact in a line before adding the components to a polymerization reactor. The aging time is normally 0.5 minutes or more. The catalyst composition thus prepared is stable for several days.

A conjugated diene polymer having a vinyl content of below 10% and a cis-1,4-bond content of 75% or more and possessing an active end can be advantageously obtained by utilizing the above-described catalyst.

In the method for producing a modified conjugated diene polymer of the present embodiment, it is preferable to use a conjugated diene polymer having a cis-1,4-bond content of 98.5% or more and a ratio (Mw/Mn) of the weight average molecular weight (Mw) to the number average molecular weight (Mn) determined by gel permeation chromatography of 3.5 or less.

The vinyl bond content and the cis-1,4 bond content of the conjugated diene polymer can be easily adjusted by controlling the polymerization temperature. The ratio Mw/Mn of the conjugated diene polymer can be easily adjusted by controlling the molar ratio of the components (c) to (e).

The Mooney viscosity ($ML_{1+4}$(100° C.)) at 100° C. of the conjugated diene polymer polymerized using the catalyst is preferably 5 to 50, and more preferably 10 to 40.

If the Mooney viscosity ($ML_{1+4}$(100° C.)) of the conjugated diene polymer is below 5, mechanical characteristics and wear resistance after vulcanization may deteriorate. If the Mooney viscosity of the conjugated diene polymer is exceeding 50, the resulting modified conjugated diene polymer may exhibit inferior processability during kneading. The Mooney viscosity of the conjugated diene polymer can be easily adjusted by controlling the molar ratio of the components (c) to (e).

[1-2] Primary Modification Reaction (Step (A))

In the method for producing a modified conjugated diene polymer of the present embodiment, the step (A) carries out a modification reaction (primary modification reaction) that reacts the component (a) with the conjugated diene polymer having a vinyl content of below 10% and a cis-1,4-bond content of 75% or more and possessing an active end to introduce the component (a) into the active end of the conjugated diene polymer to obtain a primary-modified conjugated diene polymer.

The component (a) used in the primary modification reaction is a heterocumulene compound that includes two or more functional groups shown by the general formula (1): X=C=Y (wherein X represents a carbon atom or a nitrogen atom, and Y represents an oxygen atom, a nitrogen atom, or a sulfur atom) in the molecular structure.

When X is a carbon atom and Y is an oxygen atom, the functional group is a ketene group. When X is a carbon atom and Y is a sulfur atom, the functional group is a thioketene group. When X is a nitrogen atom and Y is an oxygen atom, the functional group is an isocyanate group. When X is a nitrogen atom and Y is a sulfur atom, the functional group is a thioisocyanate group. When X and Y are nitrogen atoms, the functional group is a carbodiimide group.

Specific examples of the component (a) include 4,4'-diphenylmethane diisocyanate, polymethylene polyphenyl polyisocyanate, 2,4-tolylene diisocyanate, 2,6-tolylene diisocyanate, 1,6-hexamethylene diisocyanate, 4,4'-dicyclohexylmethane diisocyanate, isopropylidene bis(4-cyclohexylisocyanate), xylylene diisocyanate, 3,3'-dimethyl-4,4'-biphenyl diisocyanate, 3,3'-dimethoxy-4,4'-biphenyl diisocyanate, 3,3'-dimethyl-4,4'-diphenylmethane diisocyanate, 1,5-naphthalene diisocyanate, bis(2-isocyanatethyl)fumarate, 2,4-tolylene dithioisocyanate, 4,4'-diphenylmethane dithioisocyanate, 1,6-hexamethylene dithioisocyanate, and the like.

In the method for producing a modified conjugated diene polymer of the present embodiment, it is preferable to use a heterocumulene compound in which two or more of the functional groups shown by the general formula (1) are isocyanate groups as the component (a). The heterocumulene compounds used as the component (a) may be used either individually or in combination.

The component (a) is preferably used in an amount of 0.02 to 20 mmol, more preferably 0.1 to 10 mmol, and particularly preferably 0.2 to 5 mmol, based on 100 g of the conjugated diene compound.

If the amount of the component (a) is below 0.02 mmol, the primary modification reaction may not proceed sufficiently so that the functional group that reacts with the component (b) may not be sufficiently introduced into the conjugated diene polymer. If the amount of the component (a) is exceeding 20 mol, the number of functional groups in the conjugated diene polymer that react with the component (b) is saturated, and it is uneconomical.

The primary modification reaction is preferably carried out via a solution reaction. The solution reaction may be carried out in a solution that contains unreacted monomers used when polymerizing the conjugated diene polymer, for example. The primary modification reaction may be carried out by an arbitrary method. For example, the primary modification reaction may be carried out using a batch-type reactor, or may be carried out continuously using a multi-stage continuous reactor, an inline mixer, or the like. It is preferable to carry out the primary modification reaction after completion of the polymerization reaction, but before carrying out operations necessary for solvent removal, a water treatment, a heat treatment, polymer isolation, and the like.

The primary modification reaction temperature may be the same as the polymerization temperature employed when producing the conjugated diene polymer. Specifically, the primary modification reaction temperature is preferably 0 to 120° C. The primary modification reaction temperature is more preferably 10 to 100° C. If the primary modification reaction temperature is low, the viscosity of the polymer (primary-modified conjugated diene polymer) may increase. If the primary modification reaction temperature is high, the polymerization active end may be easily inactivated. The primary modification reaction time is preferably 5 minutes to 5 hours, and more preferably 15 minutes to 1 hour, for example.

In the primary modification reaction, the active end of the conjugated diene polymer reacts with at least one of the functional groups shown by the general formula (1) included in the heterocumulene compound used as the component (a) so that the component (a) is introduced into the active end of the conjugated diene polymer. Since the introduced component (a) is further reacted with the component (b) in the secondary modification reaction (step (B)) described later, at least one of the functional groups shown by the general formula (1) included in the heterocumulene compound used as the component (a) introduced into the active end must be allowed to remain unreacted.

[1-3] Secondary Modification Reaction (Step (B))

In the method for producing a modified conjugated diene polymer according to this embodiment, the step (B) carries out a modification reaction (secondary modification reaction) that reacts the component (b) with the primary-modified conjugated diene polymer obtained by the step (A) to introduce the component (b) into the functional group of the primary-modified conjugated diene polymer derived from the component (a) to obtain a secondary-modified conjugated diene polymer (modified conjugated diene polymer). Specifically, the component (b) reacts with the unreacted functional group shown by the general formula (1) that is included in the component (a) and introduced into the active end of the conjugated diene polymer.

The component (b) used for the secondary modification reaction is an active hydrogen-containing compound that includes one or more functional groups selected from the group consisting of an amino group, an imino group, a mercapto group, and a hydroxyl group. The functional groups included in the active hydrogen-containing compound may be the same or different.

In the method for producing a modified conjugated diene polymer of the present embodiment, it is preferable to use an active hydrogen-containing compound that includes two or more functional groups selected from the group consisting of an amino group, an imino group, a mercapto group, and a hydroxyl group as the component (b).

Specific examples of the component (b) are as follows. Examples of an active hydrogen-containing compound that includes an amino group or an imino group include hexamethylenediamine, heptamethylenediamine, nonamethylenediamine, dodecamethylenediamine, decamethylene diamine, 1,5-naphthalenediamine, 1,8-naphthalenediamine, 1,3-bis(aminomethyl)cyclohexane, 1,4-bis(aminomethyl)cyclohexane, hexamethyldisilazane, ethylenediamine, diethylenetriamine, triethylenetetramine, tetraethylenepentamine, pentaethylenehexamine, and the like.

Examples of an active hydrogen-containing compound that includes a mercapto group include butanedithiol, hexamethylenedithiol, heptamethylenedithiol, nonamethylenedithiol, dodecamethylenedithiol, decamethylenedithiol, bis-(2-mercaptoethyl)sulfide, 1,5-dimercaptonaphthalene, and the like.

Examples of an active hydrogen-containing compound that includes a hydroxyl group include N,N-dimethylethanolamine, N,N-diethylethanolamine, N,N-dimethylisopropanolamine, N,N-diisopropylethanolamine, N,N'-bis(2-hydroxyethyl)oxamide, 1-(bis(2-hydroxyethyl)amino)-2-propanol, and the like.

The secondary modification reaction can be carried out continuously from the primary modification reaction in the step (A). The secondary modification reaction is preferably carried out via a solution reaction in the same manner as the primary modification reaction. The solution reaction may be carried out in a solution that contains unreacted monomers used when polymerizing the conjugated diene polymer, for example.

The secondary modification reaction may be carried out by an arbitrary method. For example, the secondary modification reaction may be carried out using a batch-type reactor, or may be carried out continuously using a multi-stage continuous reactor, an inline mixer, or the like in the same manner as the primary modification reaction. It is preferable to carry out the secondary modification reaction after completion of the polymerization reaction, but before carrying out operations necessary for solvent removal, a water treatment, a heat treatment, polymer isolation, and the like.

The component (b) is preferably used in an amount of 0.02 to 20 mmol, more preferably 0.1 to 10 mmol, and particularly preferably 0.2 to 5 mmol, based on 100 g of the conjugated diene compound.

If the amount of the component (b) is below 0.02 mmol, the secondary modification reaction may not sufficiently proceed. Moreover, sufficient dispersibility with carbon black may not be achieved, and low resilience and wear resistance may not be improved. If the amount of the component (b) is exceeding 20 mmol, dispersibility with carbon black and a property improvement effect are saturated, and it is uneconomical.

The secondary modification reaction temperature may be the same as the primary modification reaction temperature. Specifically, the secondary modification reaction temperature is preferably 0 to 120° C. The secondary modification reaction temperature is more preferably 10 to 100° C. If the secondary modification reaction temperature is low, the viscosity of the polymer (secondary-modified conjugated diene polymer) may increase. If the secondary modification reaction temperature is high, the polymerization active end may be easily inactivated. The secondary modification reaction time is preferably 5 minutes to 5 hours, and more preferably 15 minutes to 1 hour, for example.

In the method for producing a modified conjugated diene polymer of the present embodiment, it is preferable to use a catalyst (addition reaction catalyst) that promotes the reaction of the functional group of the primary-modified conjugated diene polymer derived from the component (a) with the component (b) in the step (B). Specifically, it is preferable to add a catalyst (addition reaction catalyst) that promotes the reaction of the functional group of the primary-modified conjugated diene polymer derived from the component (a) with the component (b) after adding the component (a) in the step (A) or adding the component (b) in the step (B).

As the addition reaction catalyst, a compound that includes a tertiary amino group or a compound that includes at least one element among the elements of the groups 4A, 2B, 3B, 4B, and 5B in the periodic table may be used. It is preferable to use a compound that includes at least one element among titanium (Ti), zirconium (Zr), bismuth (Bi), aluminum (Al), and tin (Sn). It is particularly preferable that the compound that forms the catalyst be an alkoxide, a carboxylate, or an acetylacetonato complex salt.

Specific examples of the addition reaction catalyst include titanium-containing compounds such as tetramethoxytitanium, tetraethoxytitanium, tetra-n-propoxytitanium, tetra-1-propoxytitanium, tetra-n-butoxytitanium, a tetra-n-butoxytitanium oligomer, tetra-sec-butoxytitanium, tetra-tert-butoxytitanium, tetra(2-ethylhexyl)titanium, bis(octanediolate)bis(2-ethylhexyl)titanium, tetra(octanediolate)titanium, titanium lactate, titanium dipropoxybis(triethanolaminate), titanium dibutoxybis(triethanolaminate), titanium tributoxystearate, titanium tripropoxystearate, titanium tripropoxyacetylacetonate, titanium dipropoxybis(acetylacetonate), titanium tripropoxyethylacetoacetate, titanium propoxyacetylacetonatobis(ethylacetoacetate), titanium tributoxyacetylacetonate, titanium dibutoxybis(acetylacetonate), titanium tributoxyethylacetoacetate, titanium butoxyacetylacetonatobis(ethylacetoacetate), titanium tetrakis(acetylacetonate), titanium diacetylacetonatobis(ethylacetoacetate), titanium bis(2-ethylhexanoate)oxide, titanium bis(laurate)oxide, titanium bis(naphthate)oxide, titanium bis(stearate)oxide, titanium bis(oleate)oxide, titanium bis(linolate)oxide, titanium tetrakis(2-ethylhexanoate), titanium tetrakis(laurate), titanium tetrakis(naphthate), titanium tetrakis(stearate), titanium tetrakis(oleate), and titanium tetrakis(linolate).

Examples of the addition reaction catalyst also include bismuth tris(2-ethylhexanoate), bismuth tris(laurate), bismuth tris(naphthate), bismuth tris(stearate), bismuth tris(oleate), bismuth tris(linolate), tetraethoxyzirconium, tetra-n-propoxyzirconium, tetra-i-propoxyzirconium, tetra-n-butoxyzirconium, tetra-sec-butoxyzirconium, tetra-tert-butoxyzirconium, tetra(2-ethylhexyl)zirconium, zirconium tributoxystearate, zirconium tributoxyacetylacetonate, zirconium dibutoxybis(acetylacetonate), zirconium tributoxyethylacetoacetate, zirconium butoxyacetylacetonate bis(ethylacetoacetate), zirconium tetrakis(acetylacetonate), zirconium diacetylacetonate bis(ethylacetoacetate), zirconium bis(2-ethylhexanoate)oxide, zirconium bis(laurate)oxide, zirconium bis(naphthate) oxide, zirconium bis(stearate) oxide, zirconium bis(oleate)oxide, zirconium bis(linolate)

oxide, zirconium tetrakis(2-ethylhexanoate), zirconium tetrakis(laurate), zirconium tetrakis(naphthate), zirconium tetrakis(stearate), zirconium tetrakis(oleate), zirconium tetrakis(linolate), and the like.

Further examples of the addition reaction catalyst include triethoxyaluminum, tri-n-propoxyaluminum, tri-i-propoxyaluminum, tri-n-butoxyaluminum, tri-sec-butoxyaluminum, tri-tert-butoxyaluminum, tri(2-ethylhexyl)aluminum, aluminum dibutoxystearate, aluminum dibutoxyacetylacetonate, aluminum butoxybis(acetylacetonate), aluminum dibutoxyethyl acetoacetate, aluminum tris(acetylacetonate), aluminum tris(ethylacetoacetate), aluminum tris(2-ethylhexanoate), aluminum tris(laurate), aluminum tris(naphthate), aluminum tris(stearate), aluminum tris(oleate), aluminum tris(linolate), and the like.

Among these, bismuth tris(2-ethylhexanoate), tetra-n-propoxyzirconium, tetra-n-butoxyzirconium, zirconium bis(2-ethylhexanoate)oxide, zirconium bis(oleate)oxide, tri-1-propoxyaluminum, tri-sec-butoxyaluminum, aluminum tris(2-ethylhexanoate), aluminum tris(stearate), zirconium tetrakis (acetylacetonate), aluminum tris(acetylacetonate), tin bis(n-octanoate), tin bis(2-ethylhexanoate), tin bis(laurate), tin bis (naphthoate), tin bis(stearate), tin bis(oleate), dibutyltin diacetate, dibutyltin di-n-octanoate, dibutyltin di-2-ethylhexanoate, dibutyltin dilaurate, dibutyltin malate, dibutyltin bis (benzyl maleate), dibutyltin bis(2-ethylhexyl maleate), di-n-octyltin diacetate, di-n-octyltin di-n-octanoate, di-n-octyltin di-2-ethylhexanoate, di-n-octyltin dilaurate, di-n-octyltin maleate, di-n-octyltin bis(benzyl maleate), and di-n-octyltin bis(2-ethylhexyl maleate) are preferably used.

The addition reaction catalyst is preferably used in such an amount that the molar ratio of the above-mentioned compound to the total amount of unreacted functional groups shown by the general formula (1): X=C=Y present in the reaction system is 0.1 to 10, and more preferably 0.5 to 5.

If the molar ratio is below 0.1, the modification reaction (i.e., secondary modification reaction) may not proceed sufficiently. If the molar ratio is exceeding 10, the effect of the addition reaction catalyst is saturated, and it is uneconomical.

After completing the steps (A) and (B), a polymerization terminator and a polymerization stabilizer are optionally added to the reaction system, followed by solvent removal and drying to recover the desired modified conjugated diene polymer.

[2] Modified Conjugated Diene Polymer

A modified conjugated diene polymer according to the present embodiment of the present invention is produced by the above-described method for producing a modified conjugated diene polymer. In the modified conjugated diene polymer, the component (a) is introduced into the active end of the conjugated diene polymer, and the component (b) is introduced into at least one of the functional groups (general formula (1)) that form the component (a).

The Mooney viscosity ($ML_{1+4}$(100° C.)) of the modified conjugated diene polymer according to this embodiment is preferably 10 to 100, and more preferably 20 to 80. If the Mooney viscosity ($ML_{1+4}$, 100° C.) of the modified conjugated diene polymer is below 10, rubber properties such as fracture properties may deteriorate. If the Mooney viscosity ($ML_{1+4}$, 100° C.) of the modified conjugated diene polymer is exceeding 100, workability may deteriorate so that it may be difficult to knead the modified conjugated diene polymer with additives.

The modified conjugated diene polymer preferably has a ratio (Mw/Mn) of the weight average molecular weight (Mw) to the number average molecular weight (Mn) determined by gel permeation chromatography of 3.5 or less, more preferably 3.0 or less, and particularly preferably 2.5 or less.

[3] Rubber Composition

A rubber composition according to the present embodiment of the present invention includes the above-described modified conjugated diene polymer as a rubber component. The details of the rubber composition are described below.

[3-1] Rubber Component

The rubber component included in the rubber composition of the present embodiment includes the above-described modified conjugated diene polymer according to the present embodiment of the present invention. The content of the modified conjugated diene polymer in the rubber component is preferably 20 mass % or more, more preferably 30 mass % or more, and particularly preferably 40 mass % or more. If the content of the modified conjugated diene polymer in the rubber component is below 20 mass %, the rubber composition may exhibit insufficient mechanical properties (tensile strength and tensile elongation), insufficient crack-growth resistance, and insufficient wear resistance.

The rubber component may include one or more types of the modified conjugated diene polymer. The rubber component may include a rubber component other than the modified conjugated diene polymer.

Examples of the rubber component other than the modified conjugated diene polymer include a natural rubber, a synthetic isoprene rubber, a butadiene rubber, a styrene-butadiene rubber, an ethylene-α-olefin copolymer rubber, an ethylene-α-olefin-diene copolymer rubber, an acrylonitrile-butadiene copolymer rubber, a chloroprene rubber, a halogenated butylene rubber, a mixture of these, and the like. The rubber component other than the modified conjugated diene polymer may be a component that is partially polyfunctionalized (e.g., a branched structure is introduced by a treatment using a modifier such as tin tetrachloride or silicon tetrachloride).

[3-2] Carbon Black and Silica

It is preferable that the rubber composition of the present embodiment further include at least one of carbon black and silica.

Specific examples of the carbon black include SRF, GPF, FEF, HAF, ISAF, or SAF carbon black. It is preferable to use carbon black having an iodine adsorption (IA) of 60 mg/g or more and a dibutyl phthalate absorption (DBP) of 80 ml/100 g or more.

The effect of improving the grip performance and the fracture resistance of the rubber composition increases when using the carbon black. It is particularly preferable to use HAF, ISAF, or SAF carbon black that exhibits excellent wear resistance. The carbon black may be used either individually or in combination.

Since the modified conjugated diene polymer used for the rubber composition of the present embodiment has been modified with the component (a) and the component (b), the modified conjugated diene polymer is bonded to various functional groups on the surface of the carbon black so that the carbon black interacts with the rubber component. As a resul, the dispersibility of the carbon black in the rubber composition is improved.

Specific examples of the silica include wet silica (hydrous silicic acid), dry silica (silicic acid anhydride), calcium silicate, aluminum silicate, and the like. Among these, wet silica is preferable due to the effect of improving fracture resistance while maintaining wet grip characteristics and low rolling resistance. The silica may be used either individually or in combination.

It is preferable that the rubber composition of the present embodiment include at least one of the silica and the carbon black in an amount of 20 to 120 parts by mass based on 100 parts by mass of the rubber component. It is more preferable that the rubber composition of the present embodiment include at least one of the silica and the carbon black in an amount of 25 to 100 parts by mass from the viewpoint of a reinforcement effect and an improvement in various properties. If the amount of the silica and the carbon black is below 20 parts by mass, fracture resistance and the like may not be sufficiently improved. If the amount of the silica and the carbon black is exceeding 120 parts by mass, the processability of the rubber composition may deteriorate.

When adding the silica to the rubber composition of the present embodiment as a reinforcement filler, it is preferable to add a silane coupling agent to the rubber composition in order to further increase the reinforcement effect.

Examples of the silane coupling agent include bis(3-triethoxysilylpropyl)tetrasulfide, bis(3-triethoxysilylpropyl)trisulfide, bis(3-triethoxysilylpropyl)disulfide, bis (2-triethoxysilylethyl)tetrasulfide, bis(3-trimethoxysilylpropyl)tetrasulfide, bis(2-trimethoxysilylethyl) tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropylbenzothiazolyl tetrasulfide, 3-triethoxysilylpropylbenzolyl tetrasulfide, 3-triethoxysilylpropylmethacrylate monosulfide, 3-trimethoxysilylpropylmethacrylate monosulfide, bis(3-diethoxymethylsilylpropyl)tetrasulfide, 3-mercaptopropyldimethoxymethylsilane, dimethoxymethylsilylpropyl-N,N-dimethylthiocarbamoyl tetrasulfide, dimethoxymethylsilylpropylbenzothiazolyl tetrasulfide, and the like.

Among these, bis(3-triethoxysilylpropyl)polysulfide or 3-trimethoxysilylpropylbenzothiazyl tetrasulfide is preferable from the viewpoint of an improvement in reinforcement and the like. These silane coupling agents may be used either individually or in combination.

The amount of the silane coupling agent added is adjusted corresponding to the type of silane coupling agent and the like. The silane coupling agent is preferably used in an amount of 1 to 20 mass %, and more preferably 3 to 15 mass %, based on 100 mass % of the silica. If the amount of the silane coupling agent is 1 below 1 mass %, the silane coupling agent may not exhibit a sufficient coupling effect. If the amount of the silane coupling agent is exceeding 20 mass %, the rubber component may gel.

Various chemicals, additives, and the like normally used in the rubber industry may optionally be added to the rubber composition of the present embodiment insofar as the object of the present invention is not impaired. For example, a vulcanizing agent, a vulcanization assistant, a processing aid, a vulcanization accelerator, a process oil, an aging preventive, an anti-scorching agent, zinc oxide, stearic acid, and the like may be added to the rubber composition of the present embodiment.

Sulfur is normally used as the vulcanizing agent. The vulcanizing agent is preferably used in an amount of 0.1 to 3 parts by mass, and more preferably 0.5 to 2 parts by mass, based on 100 parts by mass of the raw material rubber (i.e., the rubber component).

As the vulcanization assistant and the processing aid, stearic acid is normally used. The vulcanization assistant and the processing aid are used in an amount of 0.5 to 5 parts by mass based on 100 parts by mass of the raw material rubber (i.e., the rubber component).

Examples of the vulcanization accelerator include thiazole vulcanization accelerators such as M (2-mercaptobenzothiazole), DM (dibenzothiazyl disulfide), and CZ (N-cyclohexyl-2-benzothiazylsulfeneamide). The vulcanization accelerator is normally used in an amount of 0.1 to 5 parts by mass, and preferably 0.2 to 3 parts by mass, based on 100 parts by mass of the raw material rubber (i.e., the rubber component).

The rubber composition of the present invention may be produced by kneading the raw materials using a mixer such as an open mixer (e.g., roller) or an internal mixer (e.g., Banbury mixer).

The rubber composition may then be molded and vulcanized to produce a rubber product. The rubber composition of the present embodiment is suitably used in tire applications such as tire tread, under-tread, carcass, sidewall, and bead, and other industrial applications such as rubber vibration insulator, fender, belt, and hose. The rubber composition of the present embodiment may be particularly suitably used as a tire tread rubber or a tire sidewall rubber.

[4] Tire Member and Tire

A tire member according to the present invention includes the rubber composition of the present invention. Specific examples of the tire member include a tire tread, an under-tread, a carcass, a sidewall, a bead, and the like. A tire according to the present invention includes the tire member of the present invention. The tire member according to the present invention and the tire including the tire member of the present invention exhibit low heat build-up and excellent wear resistance.

EXAMPLES

The present invention is further described below by way of examples. Note that the present invention is not limited to the following examples. In the examples, the unit "part" refers to "part by mass" and the unit "%" refers to "mass %" unless otherwise indicated. In the examples, various properties were measured by the following methods.

Mooney viscosity ($ML_{1+4}$, 100° C.): The Mooney viscosity was measured using an L-rotor in accordance with JIS K 6300 (preheating time: 1 min, rotor operation time: 4 min, temperature: 100° C.).

Molecular weight distribution (Mw/Mn): The molecular weight distribution (Mw/Mn) (standard polystyrene-reduced value) was measured using a gel permeation chromatograph ("HLC-8120GPC" manufactured by Tosoh Corporation) and a differential refractometer (detector) under the following conditions.

Column: "GMHHXL" manufactured by Tosoh Corporation (two columns)

Column temperature: 40° C.

Mobile phase: tetrahydrofuran

Flow rate: 1.0 ml/min

Sample concentration: 10 mg/20 ml

Microstructure (cis-1,4-bond content and 1,2-vinyl bond content): The cis-1,4-bond content and the 1,2-vinyl bond content were measured by an infrared method (Morello method) using a Fourier transform infrared spectrophotometer ("FT/IR-4100" (manufactured by JASCO Corporation)).

Tensile strength ($T_B$) and elongation ($E_B$): The tensile strength and elongation were measured in accordance with JIS K 6301. The tensile strength and the elongation were indicated by indices based on the measured values ("100")

of the vulcanized rubber of Comparative Example 3. Higher indices indicate better tensile strength and elongation.

Low heat build-up (3% tan δ): The low heat build-up value was measured using a dynamic spectrometer (manufactured by Rheometrics Scientific Inc. (U.S.A.)) at a tensile dynamic strain of 3%, a frequency of 15 Hz, and a temperature of 50° C. The low heat build-up value was indicated by an index based on the measured value ("100") of the vulcanized rubber of Comparative Example 3. A higher index indicates lower heat build-up.

Wear resistance: The wear resistance was measured at room temperature using a Lambourn abrasion tester (manufactured by Shimada Giken Co., Ltd.) at a slip ratio of 60%. The wear resistance was indicated by an index based on the abrasion loss (g) ("100") of the vulcanized rubber of Comparative Example 3. A higher index indicates better wear resistance.

Example 1

Production of Modified Polymer A

A 5-liter autoclave of which the internal atmosphere was replaced by nitrogen was charged with 2.4 kg of cyclohexane and 300 g of 1,3-butadiene in a nitrogen atmosphere. A cyclohexane solution containing neodymium versatate (0.09 mmol), a toluene solution containing methylalumoxane (hereinafter referred to from time to time as "MAO", 3.6 mmol), a toluene solution containing hydrogenated diisobutylaluminum (hereinafter may be referred to as "DIBAH", 5.5 mmol) and diethylaluminum chloride (0.18 mmol), and 1,3-butadiene (4.5 mmol) were reacted and aged at 40° C. for 30 minutes to obtain a catalyst. The autoclave was charged with the catalyst, and the components were polymerized at 60° C. for 60 minutes. The reaction conversion rate of 1,3-butadiene was about 100%.

200 g of the polymer solution was removed into a methanol solution containing 0.2 g of 2,4-di-t-butyl-p-cresol to terminate polymerization. After removing the solvent by steam stripping, the product was dried using a roll at 110° C. to obtain an unmodified polymer (conjugated diene polymer).

The Mooney viscosity ($ML_{1+4}$(100° C.)) of the conjugated diene polymer was 18. The molecular weight distribution (Mw/Mn) of the conjugated diene polymer was 2.2. The conjugated diene polymer had a cis-1,4-bond content of 96.3% and a 1,2-vinyl bond content of 0.64%. The results are shown in Table 1.

TABLE 1

| | Properties of polymer | | | | | | | |
|---|---|---|---|---|---|---|---|---|
| | Mooney viscosity $ML_{1+4}$ (100° C.) | Molecular weight distribution (Mw/Mn) | cis-1,4-bond content (%) | 1,2-vinyl bond content (%) | Component (a) Type | Amount (mmol) | Component (b) Type | Amount (mmol) |
| Exam. 1 | 18 | 2.2 | 96.3 | 0.64 | PMDI | 2.08 | HMDA | 2.08 |
| Exam. 2 | 16 | 2.3 | 96.2 | 0.58 | CMDI | 4.16 | HMDA | 2.08 |
| Exam. 3 | 17 | 2.2 | 95.8 | 0.61 | CMDI | 4.16 | HMDS | 2.08 |
| Exam. 4 | 19 | 2.3 | 96.2 | 0.62 | CMDI | 4.16 | BMES | 2.08 |
| Exam. 5 | 20 | 2.4 | 95.3 | 0.59 | CMDI | 4.16 | DEEA | 2.08 |
| Exam. 6 | 20 | 2.2 | 96.6 | 0.60 | PMDI | 2.08 | HMDA | 2.08 |
| Exam. 7 | 19 | 2.2 | 95.3 | 0.61 | PMDI | 2.08 | HMDA | 2.08 |
| Exam. 8 | 18 | 2.2 | 94.9 | 0.57 | PMDI | 2.08 | HMDA | 2.08 |
| Exam. 9 | 21 | 2.3 | 96.5 | 0.66 | PMDI | 2.08 | HMDA | 2.08 |
| Exam. 10 | 20 | 1.5 | 99.3 | 0.11 | PMDI | 2.08 | HMDA | 2.08 |
| Exam. 11 | 21 | 1.6 | 99.2 | 0.12 | PMDI | 2.08 | HMDA | 2.08 |
| Comp. Exam. 1 | 22 | 2.2 | 96.1 | 0.62 | PMDI | 2.08 | — | — |
| Comp. Exam. 2 | 19 | 2.3 | 95.3 | 0.58 | — | — | HMDA | 2.08 |
| Comp. Exam. 3 | 45 | 4.0 | 95.0 | 2.52 | — | — | — | — |

| | Catalyst | | | Properties of modified polymer | |
|---|---|---|---|---|---|
| | Type | Amount (mmol) | Modified polymer | Mooney viscosity $ML_{1+4}$ (100° C.) | Molecular weight distribution (Mw/Mn) |
| Exam. 1 | — | — | A | 42 | 2.3 |
| Exam. 2 | — | — | B | 50 | 2.5 |
| Exam. 3 | — | — | C | 44 | 2.3 |
| Exam. 4 | — | — | D | 55 | 2.6 |
| Exam. 5 | — | — | E | 36 | 2.4 |
| Exam. 6 | IPOTi | 2.08 | F | 55 | 2.4 |
| Exam. 7 | EHABi | 2.08 | G | 53 | 2.3 |
| Exam. 8 | SOBAl | 2.08 | H | 58 | 2.4 |
| Exam. 9 | TEA | 2.08 | I | 63 | 2.3 |
| Exam. 10 | — | — | J | 48 | 1.7 |
| Exam. 11 | IPOTi | 2.08 | K | 56 | 1.7 |
| Comp. Exam. 1 | — | — | L | 35 | 2.3 |
| Comp. Exam. 2 | — | — | M | 19 | 2.3 |
| Comp. Exam. 3 | — | — | N | | |

A toluene solution containing 4,4'-diphenylmethane diisocyanate (hereinafter referred to from time to time as "PMDI", 2.08 mmol) was added to the remaining polymer solution maintained at 60° C. The mixture was allowed to react (primary modification reaction) for 15 minutes. After the addition of a toluene solution containing hexamethylenediamine (hereinafter referred to from time to time as "HMDA", 2.08 mmol), the mixture was allowed to react (secondary modification reaction) for 15 minutes.

The polymer solution was removed into a methanol solution containing 1.3 g of 2,4-di-t-butyl-p-cresol to terminate polymerization. After removing the solvent by steam stripping, the product was dried using a roll at 110° C. to obtain a modified polymer A (modified conjugated diene polymer). The modification conditions and the modification reaction results are shown in Table 1. The Mooney viscosity ($ML_{1+4}$ (100° C.)) of the modified conjugated diene polymer was 42. The molecular weight distribution (Mw/Mn) of the modified conjugated diene polymer was 2.3.

Example 2

Production of Modified Polymer B

A modified polymer B (modified conjugated diene polymer) was obtained in the same manner as in Example 1, except for using polymethylenepolyphenyl polyisocyanate ("PAPI*135" (manufactured by Dow Chemical Japan Ltd.), hereinafter referred from time to time to as "CMDI", 4.16 mmol in terms of NCO) instead of PMDI (2.08 mmol). The modification conditions and the modification reaction results are shown in Table 1.

Example 3

Production of Modified Polymer C

A modified polymer C (modified conjugated diene polymer) was obtained in the same manner as in Example 2, except for using hexamethyldisilazane (hereinafter referred to from time to time as "HMDS") instead of HMDA. The modification conditions and the modification reaction results are shown in Table 1.

Example 4

Production of Modified Polymer D

A modified polymer D (modified conjugated diene polymer) was obtained in the same manner as in Example 2, except for using bis-(2-mercaptoethyl)sulfide (hereinafter referred to from time to time as "BMES") instead of HMDA. The modification conditions and the modification reaction results are shown in Table 1.

Example 5

Production of Modified Polymer E

A modified polymer E (modified conjugated diene polymer) was obtained in the same manner as in Example 2, except for using N,N-diethylethanolamine (hereinafter referred to from time to time as "DEEA") instead of HMDA. The modification conditions and the modification reaction results are shown in Table 1.

Example 6

Production of Modified Polymer F

A 5-liter autoclave of which the internal atmosphere was replaced by nitrogen was charged with 2.4 kg of cyclohexane and 300 g of 1,3-butadiene in a nitrogen atmosphere. A cyclohexane solution containing neodymium versatate (0.09 mmol), a toluene solution containing MAO (3.6 mmol), a toluene solution containing DIBAH (5.5 mmol) and diethylaluminum chloride (0.18 mmol), and 1,3-butadiene (4.5 mmol) were reacted and aged at 40° C. for 30 minutes to obtain a catalyst. The autoclave was charged with the catalyst, and the components were polymerized at 60° C. for 60 minutes. The reaction conversion rate of 1,3-butadiene was about 100%.

200 g of the polymer solution was removed into a methanol solution containing 0.2 g of 2,4-di-t-butyl-p-cresol to terminate polymerization. After removing the solvent by steam stripping, the product was dried using a roll at 110° C. to obtain an unmodified polymer (conjugated diene polymer). The polymerization reaction results are shown in Table 1.

A toluene solution containing PMDI (2.08 mmol) was added to the remaining polymer solution maintained at 60° C. The mixture was allowed to react for 15 minutes. After the addition of a toluene solution containing HMDA (2.08 mmol), the mixture was allowed to react for 15 minutes. After the addition of a toluene solution containing tetraisopropyl titanate (hereinafter referred to from time to time as "IPOTi", 2.08 mmol), the components were mixed for 30 minutes.

The polymer solution was removed into a methanol solution containing 1.3 g of 2,4-di-t-butyl-p-cresol to terminate polymerization. After removing the solvent by steam stripping, the product was dried using a roll at 110° C. to obtain a modified polymer F (modified conjugated diene polymer). The modification conditions and the modification reaction results are shown in Table 1.

Example 7

Production of Modified Polymer G

A modified polymer G (modified conjugated diene polymer) was obtained in the same manner as in Example 6, except for using bismuth tris(2-ethylhexanoate) (hereinafter referred to from time to time as "EHABi") instead of IPOTi. The modification conditions and the modification reaction results are shown in Table 1.

Example 8

Production of Modified Polymer H

A modified polymer H (modified conjugated diene polymer) was obtained in the same manner as in Example 6, except for using tri-sec-butoxyaluminum (hereinafter referred to from time to time as "SBOAl") instead of IPOTi. The modification conditions and the modification reaction results are shown in Table 1.

Example 9

Production of Modified Polymer I

A modified polymer I (modified conjugated diene polymer) was obtained in the same manner as in Example 6, except for using triethylamine (hereinafter referred to from time to time as "TEA") instead of IPOTi. The modification conditions and the modification reaction results are shown in Table 1.

Example 10

Production of Modified Polymer J

A 5-liter autoclave of which the internal atmosphere was replaced by nitrogen was charged with 2.4 kg of cyclohexane and 300 g of 1,3-butadiene in a nitrogen atmosphere. A cyclohexane solution containing neodymium versatate (0.18 mmol), a toluene solution containing MAO (3.6 mmol), a toluene solution containing DIBAH (7.4 mmol) and trimethylsilyl iodide (0.36 mmol), and 1,3-butadiene (9.0 mmol) were reacted and aged at 40° C. for 60 minutes to obtain a catalyst. The autoclave was charged with the catalyst, and the components were polymerized at 10° C. for 150 minutes. The reaction conversion rate of 1,3-butadiene was about 100%.

200 g of the polymer solution was removed into a methanol solution containing 0.2 g of 2,4-di-t-butyl-p-cresol to terminate polymerization. After removing the solvent by steam stripping, the product was dried using a roll at 110° C. to obtain an unmodified polymer (conjugated diene polymer). The polymerization reaction results are shown in Table 1.

A toluene solution containing PMDI (2.08 mmol) was added to the remaining polymer solution maintained at 10° C. The mixture was allowed to react for 15 minutes. After the addition of a toluene solution containing HMDA (2.08 mmol), the mixture was allowed to react for 15 minutes.

The polymer solution was removed into a methanol solution containing 1.3 g of 2,4-di-t-butyl-p-cresol to terminate polymerization. After removing the solvent by steam stripping, the product was dried using a roll at 110° C. to obtain a modified polymer J (modified conjugated diene polymer). The modification conditions and the modification reaction results are shown in Table 1.

Example 11

Production of Modified Polymer K

A 5-liter autoclave of which the internal atmosphere was replaced by nitrogen was charged with 2.4 kg of cyclohexane and 300 g of 1,3-butadiene in an nitrogen atmosphere. A cyclohexane solution containing neodymium versatate (0.18 mmol), a toluene solution containing MAO (3.6 mmol), a toluene solution containing DIBAH (7.4 mmol) and trimethylsilyl iodide (0.36 mmol), and 1,3-butadiene (9.0 mmol) were reacted and aged at 40° C. for 60 minutes to obtain a catalyst. The autoclave was charged with the catalyst, and the components were polymerized at 10° C. for 150 minutes. The reaction conversion rate of 1,3-butadiene was about 100%.

200 g of the polymer solution was removed into a methanol solution containing 0.2 g of 2,4-di-t-butyl-p-cresol to terminate polymerization. After removing the solvent by steam stripping, the product was dried using a roll at 110° C. to obtain an unmodified polymer (conjugated diene polymer). The polymerization reaction results are shown in Table 1.

A toluene solution containing PMDI (2.08 mmol) was added to the remaining polymer solution maintained at 10° C. The mixture was allowed to react for 15 minutes. After the addition of a toluene solution containing HMDA (2.08 mmol), the mixture was allowed to react for 15 minutes. After the addition of a toluene solution containing IPOTi (2.08 mmol), the components were mixed for 30 minutes.

The polymer solution was removed into a methanol solution containing 1.3 g of 2,4-di-t-butyl-p-cresol to terminate polymerization. After removing the solvent by steam stripping, the product was dried using a roll at 110° C. to obtain a modified polymer K (modified conjugated diene polymer). The modification conditions and the modification reaction results are shown in Table 1.

Comparative Example 1

Production of Modified Polymer L

A modified polymer L (modified conjugated diene polymer) was obtained in the same manner as in Example 1, except that HMDA was not added (i.e., the secondary modification reaction was not performed). The modification conditions and the modification reaction results are shown in Table 1.

Comparative Example 2

Production of Modified Polymer M

A modified polymer M (modified conjugated diene polymer) was obtained in the same manner as in Example 1, except that PMDI was not added (i.e., the primary modification reaction was not performed). The modification conditions and the modification reaction results are shown in Table 1.

Comparative Example 3

Polymer N

Table 1 shows the analysis results of a commercially available polybutadiene rubber ("BR01" manufactured by JSR Corporation).

A carbon black-containing rubber composition in which only the modified polymer was used as the rubber component (composition 1), a carbon black-containing rubber composition in which a natural rubber was also used as the rubber component (composition 2), and a carbon black-containing rubber composition in which a styrene-butadiene rubber was also used as the rubber component (composition 3), were prepared using each of the modified polymers A to M, and the polymer N obtained in Examples 1 to 11 and Comparative Examples 1 to 3. The composition was vulcanized at 145° C. for 33 minutes, and the properties of the resulting vulcanized rubber were evaluated. The results are shown in Table 3.

TABLE 2

| Component | Composition 1 (parts) | Composition 2 (parts) | Composition 3 (parts) |
| --- | --- | --- | --- |
| (Modified) polymer A to N | 100 | 50 | 50 |
| Natural rubber | 0 | 50 | 0 |
| Styrene-butadiene rubber*[1] | 0 | 0 | 50 |
| Carbon black*[2] | 50 | 50 | 50 |
| Zinc oxide | 3.5 | 3.5 | 3.5 |
| Stearic acid | 2 | 2 | 2 |
| Aging preventive*[3] | 1.5 | 1.5 | 1.5 |
| Vulcanization accelerator*[4] | 1.5 | 1.5 | 1.5 |
| Sulfur | 1 | 1 | 1 |

*[1]"SL563" (manufactured by JSR Corporation)
*[2]"Seast KH" (manufactured by Tokai Carbon Co., Ltd.)
*[3]N-phenyl-N'-(1,3-dimethylbutyl)-p-phenylenediamine ("Nocrac 6C" (manufactured by Ouchi Shinko Chemical Industrial Co., Ltd.))
*[4]N-cyclohexyl-2-benzothiazylsulfeneamide ("Nocceler CZ" (manufactured by Ouchi Shinko Chemical Industrial Co., Ltd.))

TABLE 3

| | (Modified) polymer | Composition 1 ||||  Composition 2 ||
| | | Tensile strength $T_B$ | Elongation $E_B$ | Low heat build-up 3% tanδ | Wear resistance | Tensile strength $T_B$ | Elongation $E_B$ |
|---|---|---|---|---|---|---|---|
| Exam. 1 | A | 106 | 108 | 143 | 141 | 104 | 102 |
| Exam. 2 | B | 105 | 105 | 145 | 142 | 103 | 103 |
| Exam. 3 | C | 107 | 106 | 138 | 139 | 105 | 107 |
| Exam. 4 | D | 108 | 103 | 139 | 133 | — | — |
| Exam. 5 | E | 106 | 104 | 137 | 134 | — | — |
| Exam. 6 | F | 107 | 106 | 152 | 132 | 103 | 105 |
| Exam. 7 | G | 110 | 108 | 151 | 131 | 107 | 102 |
| Exam. 8 | H | 106 | 103 | 147 | 134 | — | — |
| Exam. 9 | I | 108 | 106 | 152 | 129 | — | — |
| Exam. 10 | J | 132 | 113 | 156 | 157 | 118 | 110 |
| Exam. 11 | K | 135 | 118 | 158 | 159 | 117 | 108 |
| Comp. Exam. 1 | L | 105 | 103 | 118 | 118 | 102 | 102 |
| Comp. Exam. 2 | M | 102 | 104 | 109 | 112 | 102 | 103 |
| Comp. Exam. 3 | N | 100 | 100 | 100 | 100 | 100 | 100 |

| | Composition 2 || Composition 3 ||||
| | Low heat build-up 3% tanδ | Wear resistance | Tensile strength $T_B$ | Elongation $E_B$ | Low heat build-up 3% tanδ | Wear resistance |
|---|---|---|---|---|---|---|
| Exam. 1 | 124 | 119 | 103 | 102 | 122 | 121 |
| Exam. 2 | 125 | 121 | 104 | 104 | 127 | 119 |
| Exam. 3 | 116 | 114 | 103 | 103 | 115 | 116 |
| Exam. 4 | — | — | — | — | — | — |
| Exam. 5 | — | — | — | — | — | — |
| Exam. 6 | 122 | 122 | 102 | 103 | 121 | 119 |
| Exam. 7 | 126 | 124 | 104 | 105 | 125 | 123 |
| Exam. 8 | — | — | — | — | — | — |
| Exam. 9 | — | — | — | — | — | — |
| Exam. 10 | 128 | 135 | 107 | 107 | 126 | 129 |
| Exam. 11 | 131 | 138 | 108 | 109 | 129 | 127 |
| Comp. Exam. 1 | 108 | 109 | 103 | 102 | 108 | 107 |
| Comp. Exam. 2 | 103 | 105 | 101 | 103 | 105 | 103 |
| Comp. Exam. 3 | 100 | 100 | 100 | 100 | 100 | 100 |

As is clear from the evaluation results of the compositions 1 to 3 of Examples 1 to 11 in which the two modification reactions (primary and secondary modification reactions) were carried out and the compositions 1 to 3 of Comparative Example 3 in which the modification reaction was not carried out, the modified polymer synthesized by the production method of the present invention exhibited sufficiently improved low heat build-up and wear resistance.

As is clear from the evaluation results of Comparative Examples 1 and 2, the above improvement effects could not be achieved by the modification reaction using one component (i.e., only the primary modification reaction (Comparative Example 1) or the secondary modification reaction (Comparative Example 2)). The modified polymers of Examples 1 to 11 exhibited a tensile strength ($T_B$) and elongation ($E_B$) equal to or higher than those of Comparative Examples 1 to 3.

Industrial Applicability

The method for producing a modified conjugated diene polymer of the present invention produces a novel modified conjugated diene polymer in which the molecular weight of the conjugated diene polymer is increased or the polymer chain is branched and which exhibits improved interaction with carbon black and silica by subjecting the active end of the conjugated diene polymer to two modification reactions (primary and secondary modification reactions).

A modified conjugated diene polymer that exhibits low heat build-up (low fuel consumption) and excellent wear resistance can be obtained by carrying out such modification reactions. Therefore, the rubber composition including the modified conjugated diene polymer obtained by the present invention can be used in tire applications such as tire tread, under-tread, carcass, sidewall and bead, and other industrial applications suc as rubber vibration insulator, fender, belt and hose. The rubber composition is particularly suitably used as tire tread rubber and a tire sidewall rubber.

The invention claimed is:

1. A method for producing a modified conjugated diene polymer, comprising:
   (A) carrying out a primary modification reaction that reacts a component (a) with a conjugated diene polymer having a vinyl content of below 10% and a cis-1,4-bond content of 75% or more and possessing an active end to which component (a) is introduced to obtain a primary-modified conjugated diene polymer, and
   (B) carrying out a secondary modification reaction that reacts a component (b) with the primary-modified conjugated diene polymer to introduce component (b) into a functional group of the primary-modified conjugated diene polymer derived from the component (a) to obtain a secondary-modified conjugated diene polymer, wherein the component (a) is a heterocumulene compound that includes two or more functional groups shown by the general formula (1): X=C=Y in which X represents a carbon atom or a nitrogen atom, and Y represents an oxygen atom, a nitrogen atom, or a sulfur atom in the molecular structure, and the component (b) is an active hydrogen-containing compound that includes one or more functional groups selected from the group consisting of an amino group, an imino group, and a mercapto group, wherein the secondary modification reaction (B) utilizes a catalyst that promotes a reaction between the component (b) and the functional group of the primary-modified conjugated diene polymer derived from the component (a).

2. The method for producing a modified conjugated diene polymer according to claim 1, wherein two or more functional groups among the functional groups shown by the general formula (1) included in the heterocumulene compound are isocyanate groups.

3. The method for producing a modified conjugated diene polymer according to claim 1, wherein the component (b) is an active hydrogen-containing compound that includes two or more functional groups selected from the group consisting of an amino group, an imino group, and a mercapto group.

4. The method for producing a modified conjugated diene polymer according to claim 1, wherein the catalyst is a compound that includes a tertiary amino group or a compound that includes one or more elements selected from the elements of the groups 4A, 2B, 3B, 4B, and 5B in the periodic table.

5. The method for producing a modified conjugated diene polymer according to claim 1, wherein the conjugated diene polymer includes a repeating unit derived from a monomer selected from the group consisting of 1,3-butadiene, isoprene, and 2,3-dimethyl-1,3-butadiene.

6. The method for producing a modified conjugated diene polymer according to claim 1, wherein the conjugated diene polymer has been polymerized in the presence of a catalyst that includes components (c) to (e) as main components, wherein component (c) is a lanthanoid element-containing compound that contains at least one lanthanoid element or a reaction product obtained by reacting the lanthanoid element-containing compound with a Lewis base, component (d) is at least one compound selected from an alumoxane and an organoaluminum compound shown by the general formula (2): $AlR^1R^2R^3$ in which $R^1$ and $R^2$ individually represent a hydrocarbon group having 1 to 10 carbon atoms or a hydrogen atom, and $R^3$ represents a hydrocarbon group having 1 to 10 carbon atoms that is the same as or differs from $R^1$ and $R^2$, and component (e) is a halogen-containing compound that contains at least one halogen element in the molecular structure.

7. The method for producing a modified conjugated diene polymer according to claim 1, wherein the conjugated diene polymer has a cis-1,4-bond content of 98.5% or more and a ratio (Mw/Mn) of the weight average molecular weight (Mw) to the number average molecular weight (Mn) of 3.5 or less determined by gel permeation chromatography.

8. The method for producing a modified conjugated diene polymer according to claim 1, wherein component (b) includes an amino group.

9. The method for producing a modified conjugated diene polymer according to claim 1, wherein component (b) includes an imino group.

10. The method for producing a modified conjugated diene polymer according to claim 1, wherein component (b) includes a mercapto group.

* * * * *